United States Patent [19]

Zecher et al.

[11] Patent Number: 4,829,140

[45] Date of Patent: May 9, 1989

[54] POLYAMIDIMIDES HAVING MODIFIED END GROUPS

[75] Inventors: Wilfried Zecher, Leverkusen; Klaus Reinking, Wermelskirchen, both of Fed. Rep. of Germany

[73] Assignee: Bayer Aktiengesellschaft, Leverkusen, Fed. Rep. of Germany

[21] Appl. No.: 766,538

[22] Filed: Aug. 19, 1985

[30] Foreign Application Priority Data

Aug. 30, 1984 [DE] Fed. Rep. of Germany ........ 3431858

[51] Int. Cl.$^4$ .............................................. C08G 73/14
[52] U.S. Cl. ........................................ 528/73; 264/204
[58] Field of Search ........................... 528/73; 264/204

[56] References Cited

U.S. PATENT DOCUMENTS

| | | | |
|---|---|---|---|
| 3,238,181 | 3/1966 | Anderson et al. | 528/73 |
| 3,658,773 | 4/1972 | Zecher et al. | 528/73 |
| 3,682,860 | 9/1969 | Yoda et al. | 528/73 |
| 3,752,791 | 8/1973 | Zecher et al. | 525/424 |
| 3,817,926 | 6/1974 | Pauze et al. | 528/73 |
| 4,088,637 | 5/1978 | Zecher et al. | 525/424 |
| 4,549,006 | 10/1985 | Zecher et al. | 528/73 |

FOREIGN PATENT DOCUMENTS 1795752 6/1979 Fed. Rep. of Germany .
988828 6/1963 United Kingdom .

*Primary Examiner*—John Kight
*Assistant Examiner*—Dennis R. Daley
*Attorney, Agent, or Firm*—Connolly and Hutz

[57] ABSTRACT

Thermoplastic polyamidimides useful for high temperature coating and having exceptional tensile strength and dimensional stability to heat are produced by condensation of organic polyisocyanates, such as aliphatic, aliphatic-aromatic or aromatic diisocyanates, with cyclic polycarboxylic acid anhydrides and lactams or polyamides carried out at temperatures of from 0° to 400° C. and optionally in a solvent together with from 0.1 to 10 mol-%, preferably from 0.2 to 4 mol-%, of an imidocarboxylic acid corresponding to the following formula

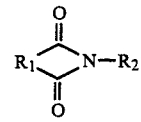

wherein $R_1$ and $R_2$ represent aliphatic, aliphatic-aromatic or aromatic groups and $R_1$ carries at least one cyclic anhydride group or carboxyl group in addition to the cyclic imide group.

3 Claims, No Drawings

POLYAMIDIMIDES HAVING MODIFIED END GROUPS

This invention relates to a process for the production of polyamidimides and to the use thereof as synthetic resins.

It is known that aliphatic-aromatic polyamidimides obtained by the reaction of polyisocyanate with cyclic polycarboxylic acid anhydrides and lactams (DE-AS No. 1,770,202) or polyamides (DE-AS No. 1,956,512) have exceptional properties, such as high softening temperatures and good elasticity, and may be used as high temperature coatings, e.g. in the field of electrical insulating lacquers.

It has now been found that polymers which have excellent properties, especially when used as thermoplasts, are obtained if the condensation of organic polyisocyanates, such as aliphatic, aliphatic-aromatic or aromatic diisocyanates, with cyclic polycarboxylic acid anhydrides and lactams or polyamides is carried out at temperatures of from 0° to 400° C. and optionally in a solvent together with from 0.1 to 10 mol-%, preferably from 0.2 to 4 mol-%, of an imidocarboxylic acid corresponding to the following general formula (I):

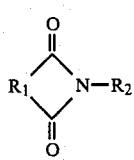

(I)

wherein
R₁ and R₂ represent aliphatic, aliphatic-aromatic or aromatic groups and R₁ carries at least one cyclic anhydride group or carboxyl group in addition to the cyclic imide group.

It has further been found that these polymers may be produced for example, in solvents and then concentrated in an evaporation extruder at temperatures of from 250° to 400° C., optionally under vacuum.

The polyamidimides produced according to the present invention are distinguished by the advantageous mechanical properties thereof, such as dimensional stability to heat, impact strength, good fire characteristics, high tracking resistance, light color, high decomposition temperatures and good flow characteristics. The process also enables end groups to be incorporated by way of amines when the corresponding isocyanates are either difficult to obtain or liable to cause difficulties in the reaction due to the volatility thereof.

The imidocarboxylic acids to be used according to the present invention may be obtained, for example, from the corresponding polycarboxylic acids or carboxylic acid-carboxylic acid anhydrides, e.g. trimellitic acid anhydride, and the amines. They may be prepared separately or in situ.

The imidocarboxylic acids used according to the present invention may be compounds corresponding to the following general formula (I):

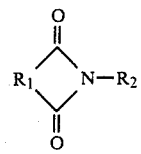

(I)

wherein
R₁ represents an optionally further substituted $C_2$–$C_{20}$ aliphatic group or $C_5$–$C_{10}$ cycloaliphatic group, an aliphatic-aromatic group having from 1 to 10 carbon atoms in the aliphatic moiety and from 6 to 10 carbon atoms in the aromatic moiety or an aromatic group having from 6 to 10 carbon atoms and containing at least one carboxylic or cyclic carboxylic acid anhydride group; and
R₂ represents an optionally substituted $C_1$–$C_{25}$ aliphatic group or $C_5$–$C_{10}$ cycloaliphatic group, an aliphatic-aromatic group having from 1 to 20 carbon atoms in the aliphatic moiety and from 6 to 10 carbon atoms in the aromatic moiety or an aromatic group having from 6 to 10 carbon atoms or a polymeric residue.

Propane, butane, benzene, diphenyl and naphthalene are examples of the groups R₁.

It is particularly preferred to use N-substituted derivatives of trimellitic imidocarboxylic acid (II):

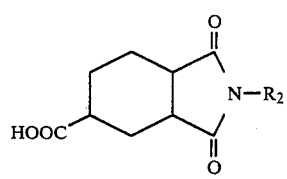

(II)

wherein
R₂ is as defined in connection with general formula (I).

The following are examples of groups R₂: methane, ethane, n-, iso- and t-butane, hexane, dodecane, octadecane, propene, butyne, cyclohexane, benzene, naphthalene, diphenyl ether, ω- or nuclear-substituted toluene, dodecyl benzene and polyethers which may be mono- or poly-substituted with halogens, such as fluorine, chlorine, bromine or fluoroalkyl groups or with alkyl, aryl, hydroxy, alkoxy or aroxy groups.

The polyisocyanates used for the process according to the present invention are preferably those described, for example, in DE-OS No. 1,770,202.

Particularly preferred are the phosgenated condensates of aniline and formaldehyde having a polyphenylene-methylene structure, commercial mixtures of tolylene diisocyanates, m-phenylene diisocyanate and symmetric compounds, such as 4,4'-diisocyantodiphenyl methane, 4,4'-diisocyanatodiphenyl ether, naphthylene-(1,5)diisocyanate, p-phenylene diisocyanate, 4,4'-diisocyanatodiphenyldimethyl methane, analogous hydroaromatic diisocyanates, such as 4,4'-diisocyanato-dicyclohexyl methane and aliphatic diisocyanates having from 2 to 12 carbon atoms, such as hexamethylene diisocyanate, isomeric trimethylhexamethylene diisocyanates, diisocyanates derived from isophorone and mixtures thereof.

One particular embodiment of the process involves using mixtures of from 40 to 95%, by weight, of an aromatic diisocyanate, e.g. 4,4-diisocyanato-diphenyl methane or 2,4- or 2,6-tolylene diisocyanate, and from 5 to 60%, by weight, of an aliphatic diisocyanate, e.g. 4,4'-diisocyanatodicyclohexyl methane, isophorone diisocyanate, hexamethylene diisocyanate and trimethylhexamethylene diisocyanate, or mixtures of from 40 to 95%, by weight, of 4,4'-diisocyanatodiphenyl methane and from 5 to 60%, by weight, of 2,4- and/or 2,6-tolylene diisocyanate or commercial mixtures thereof.

Instead of using these isocyanates, the process may also be carried out using compounds which react as isocyanates under the reaction conditions, particularly the addition compounds of alcohols, phenols and lactams, e.g. of phenol, commercial cresol mixtures and caprolactam, or the addition compounds of mixtures of the amines corresponding to the isocyanates and aliphatic and aromatic carbonic acid esters, e.g. carbonic acid diethyl ester, acarbonic acid diphenyl ester and ethylene carbonate, which may already partly have reacted together, or polycarbodiimides and isocyanatoisocyanurates obtained from the polyisocyanates described.

The cyclic polycarboxylic acid anhydrides used for the process according to the present invention may be the compounds of the type described in DE-OS No. 1,770,202 and DE-OS No. 2,542,706, preferably polycarboxylic acid anhydrides corresponding to the following general formula (III):

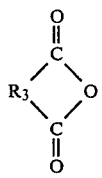
(III)

wherein
R$_3$ represents an optionally substituted C$_2$–C$_{20}$ aliphatic group, a C$_5$–C$_{10}$ cycloaliphatic group, an aliphatic-aromatic group having from 1 to 10 carbon atoms in the aliphatic moiety and from 6 to 10 carbon atoms in the aromatic moiety or an aromatic group having from 6 to 10 carbon atoms which contains at least one carboxyl group or cyclic anhydride group in addition to the cyclic anhydride group already present.

The following are examples: butane tetracarboxylic acid dianhydride, cyclopentane tetracarboxylic acid dianhydride, pyromellitic acid dianhydride, benzophenone tetracarboxylic acid dianhydride and trimellitic acid anhydride, the latter being particularly preferred.

Instead of using carboxylic acid anhydrides the process may be carried out using derivatives thereof, such as alkyl esters or phenyl esters, or the polycarboxylic acids themselves, these being converted into the acid anhydrides in the course of the reaction.

Examples of suitable lactams for the process according to the present invention include those corresponding to the following general formula (IV):

(IV)

wherein
X represents an integer of from 2 to 20.

Caprolactam is preferably used.

Polyamides, such as those described in DAS No. 1,956,512, may be used instead of or in combination with the lactams. The following are examples: polycarponamide (Nylon 6), polydodecane acid amide and polyamides of dicarboxylic acids, such as adipic acid, sebacic acid, oxalic acid, dibutyl malonic acid, isophthalic acid and terephthalic acid, and diamines, such as ethylene diamine, hexamethylene diamine, decamethylene diamines and m- and p-phenylene diamine. Polycapronamide (Nylon 6) and polyhexamethylene adipamide (Nylon 66) are preferably used.

The reaction according to the present invention may be carried out in solvents, as described in DE-AS No. 1,770,202. The solvents used are preferably phenols, such as phenol or commercial mixtures of o-, m- and p-cresols, or lactams, such as caprolactam or N-methylcaprolactam, butyrolactone or tetramethylene sulphone. To carry out the reaction according to the present invention, the components with or without solvents, are maintained at temperatures of from 0° to 400° C. for several minutes or up to several hours. The progress of the reaction may be ascertained, for example, from the evolution of gas, the increase in viscosity and the IR spectra.

Polyamidimides produced according to the present invention having a relatively viscosity of from 1.5 to 3.0 mPas, preferably from 1.7 to 2.6 mPas, determined using a 1% solution in cresol at 25° C., have been found to be particularly suitable.

It is sometimes advantageous to carry out the reaction for the production of the compounds in several stages or to add the individual components in a different sequence or at different temperatures. Thus, the polymer may be produced in a phenolic solvent and then precipitated from solution with non-solvent, such as methanol, and optionally after-condensed in an extruder.

According to a preferred embodiment of the process, the polymer is prepared ina solvent and is then optionally already concentrated in the reaction vessel to form a fluid soluton or a pourable resin or the reaction is carried out under pressure with heating to a temperature of from 200° to 250° C., preferably from 210° to 230° C., for from 1 to 10 hours, and the remaining operation of concentration if indicated with after-condensation, is carried out in an evaporaion extruder, optionally under vacuum, at temperatures of from 240° to 400° C., preferably from 280° to 350° C.

The reaction is generally carried out using 1 mol of carboxylic acid or cyclic acid anhydride, including the from 0.1 to 10 mol-% of imidocarboxylic acid, per mol of isocyanate, and from 0.5 to 2 mol of lactam or amide per mol of carboxylic acid anhydride, although widely differing proportions may be used.

According to another possible embodiment of the process, excess isocyanate is reacted with di- or tri-carboxylic acids, e.g adipic acid, terephthalic acid, isophthalic acid or trimesic acid, and excess carboxylic acid is reacted with polyfunctional alcohols, e.g. ethylene glycol, neopentyl glycol, hexane diol, trimethylolpropane, tris-hydroxyethyl-isocyanurate, trs-hydroxyethyl-urazole and polyesters carrying hydroxyl end groups.

The process of the production of the polymers according to the present invention may be influenced by catalysts, e.g. by amines, such as triethylamine, 1,4-diazobicyclo-(2,2,2)-octane, N-ethyl-morpholine, N- methyl-imidazole and 2-methyl-imidazole, or by inorganic or organic metal compounds, in particular compounds of iron, lead, zinc, tin, copper, cobalt or titanium, such as iron(III) chloride, cobalt acetate, lead oxide, lead acetate, tin octoate, dibutyl tin dilaurate, copper acetylacetonate, titanium tetrabutylate, alkali metal phenolates or sodium cyanide, or by phosphorus compounds, such as trialkyl phosphine and methylene phospholine oxide.

The polyamidimides according to the present invention are distinguished by the exceptional tensile strength, E-moduli and dimensional stability to heat thereof. The properties thereof may be varied for different fields of application by varying the stoichiometric ratios and degrees of condensation and by adding low molecular weight or high molecular weight components, such as fillers, pigments, anti-agers, lubricants, plasticizers and other polymers, The addition of lactams, such as dodecane lactam, and phenols, such as dodecyl phenol, has been found to be advantageous especially for the use of the polyamidimides as thermoplasts.

EXAMPLES

EXAMPLE 1

225 g of 4,4'-diisocyanatodiphenyl methane, 17.4 g of a mixture of 80% of 2,4- and 20% of 2,6-tolylene diisocyanate, 7.18 g of N-dodecyl-trimellitic acid imide and 190 g of trimellitic acid anhydride are introduced into a solution of 113 g of caprolactam in 380 g of a mixture of equal parts of phenol and a mixture of commercial cresols of from 120° to 130° C. Condensation to the polyamidimide is carried out, with stirring at 170° C. for 2 hours, 190° C. for 2 hours and 205° C. for 4 hours. 225 g of the solvent are then distilled off under a slight vacuum and the residue is heated to 215° C. for 4 hours. The product obtained on cooling is a brittle resin having a solids content of about 75%, by weight. The viscosity $\eta^{25}$ of a 15% solution in the cresol is 850 mPas.

A sample of the resin is concentrated by evaporation in a stream of nitrogen, first to 250° C. and then at 300° C. A transparent, fusible and elastic resin having a relative viscosity of $\eta=2.10$ determined at 25° C. using a 1% solution in cresol is obtained.

EXAMPLE 2

Production of the resin is carried out as in Example 1. The imidocarboxylic acid used is 2.60 g of N-[3,3,5-trimethylcyclohexyl]-trimellitic acid imide. A brittle brown resin having a viscosity of $\eta^{25}=530$ mPas determined using a 15% solution of the resin in cresol is obtained. 100 g of the resin are concentrated by evaporation in a stream of nitrogen, first at 250° C., then at 300° C. A light brown, elastic resin having a relative viscosity of $\eta=1.85$ determined using a 1% solution in cresol at 25° C. is obtained.

EXAMPLE 3

Production of the resin is carried out as in Example 1. 4.43 g of N-octadecyl-trimellitic acid imide are used as imidocarboxylic acid. The polyamidimide is obtained as brittle resin having a solids content of about 75%, by weight. The viscosity $\eta^{25}$ of a 15% solution in cresol is 1030 mPas. 2 g of a mixture of commercial nonyl phenols are added to 100 g of the molten resin, which is then concentrated by evaporation in a stream of nitrogen, first at 250° C., then at 300° C. The residue obtained is a fusible, elastic resin having a relatively viscosity of $\eta=2.15$.

EXAMPLE 4

90 g of polycapronamide (Nylon 6) are dissolved in 375 g of phenol/cresol (1:1). 250 g of 4,4'-diisocyanatodiphenyl methane, 24.24 g of N-[2-ethylhexyl]-trimellitic acid imide and 184 g of trimelltic acid anhydride are then introduced at from 120° to 130° C. and the reaction mixture is heated, with stirring, to 170° C. for 2 hours, to 190° C. for 2 hours and to 205° C. for 8 hours. 690 g of phenol/cresol (1:1) are then added to dilute the reaction mixture to a solids content of about 30%, by weight. The polyamidimide is obtained as a light brown, viscous solution. The viscosity $\eta^{25}$ of a 15% solution in cresol is 390 mPas.

A sample of the solution is diluted to a solids content of 20%, by weight, using cresol and stirred into methanol. The polyamidimide is obtained as a yellow powder, which is melted at 300° C. to form a hard, yellowish-brown resin.

EXAMPLE 5

174 g of a commercial mixture of 80%, by weight, of 2,4- and 20%, by weight, of 2,6-tolylene diisocyanate, 2250 g of 4,4'-idiisocyanatodiphenyl methane, 53.4 g of N-phenyl-trimellitic acid imide and 1900 g of trimellitic acid anhydride are introduced into a solution of 1130 g of caprolactam in 3800 g of phenol/cresol (1:1) at from 120° C. to 130° C. The reaction mixture is stirred for 2 hours at 190° C. and for 4 hours at from 200° to 205° C. 2260 g of the solvent mixture are then distilled off under reduced pressure and the residue is after-condensed for 2 hours at 215° C. 139 g of dodecane lactam are then stirred in. The polyamidimide is obtained as a brittle brown resin having a solids content of $\approx 75\%$, by weight. The viscosity $\eta^{25}$ of a 15% solution in cresol is 650 mPas. The resin is cut up in a cutting mill and concentrated in a ZSK 32 evaporator extruder in which the maximum temperature of the jacket is 330° C. and the pressure in the evaporation zone is 10 mbar. A transparent, elastic resin having a relative viscosity of 2.13, determined using a 1% solution in cresol at 25° C., is obtained.

EXAMPLE 6

Production of the resin is carried out as in Example 5. 8.70 g of N-[4-dodecylphenyl]-trimellitic acid imide are used as the imidocarboxylic acid. The polyamidimide is obtained as a brittle resin having a solids content of about 75%, by weight. The viscosity $\eta^{25}$ of a 15% solution in cresol is 720 mPas. A solution in methane phosphonic acid dimethyl ester shows the characteristic bands for imides at 1715 and 1775 $cm^{-1}$.

A sample of the resin is concentrated by evaporation in a stream of nitrogen, first at 250° C., then at 300° C. An elastic, fusible resin having a relative viscosity of $\eta=2.03$, determined using a 1% solution in cresol at 25° C., is obtained.

EXAMPLE 7

131 g of 4,4'-diisocyanatodicyclohexyl methane, 125 g of 4,4'-diisocyanatodiphenyl methane, 4.10 g of trimellitic acid imide and 190 g of trimellitic acid anhydride are introduced into 390 g of cresol and 113 g of caprolactam at 120° C. The reaction mixture is then stirred at 170° C. for 2 hours, at 190° C. for 2 hours and at from 200 to 205° C. for 4 hours. 230 g of solvent are then distilled off under vacuum and the residue is heated to 215° C. for 4 hours. The polyamidimide is obtained as a brittle resin having a solids content of about 75%, by weight. The viscosity $\eta^{25}$ of a 15% solution in cresol is 590 mPas.

A sample of the resin is concentrated by evaporation in a stream of nitrogen at 250° C. and then 300° C. A fusible, elastic resin having a relative viscosity of $\eta = 1.98$ is obtained.

EXAMPLE 8

Production of the resin is carried out as in Example 7. The imidocarboxylic acid used is 5.62 g of N-benzyl-trimellitic acid imide. A brittle resin having a solids content of 75%, by weight, and a viscosity of $\eta^{25} = 620$, determined using a 15% solution in cresol, is obtained.

A sample of the resin concentrated by evaporation in a stream of nitrogen at 250° C. and 300° C. results in an elastic resin having a relative viscosity of $\eta = 2.06$.

We claim:

1. Process for the production of polyamidimides by condensation of polyisocyanates, cyclic polycarboxylic acid anhydrides and lactams or polyamides at temperatures of from 0° to 400° C. and optionally in a solvent, characterised in that the condensation is carried out with the addition of from 0.1 to 10 mol-% of an imidocarboxylic acid.

2. Process for the production of polyamidimides according to claim 1, characterised in that the imidocarboxylic acids used are compounds corresponding to the following general formula (II):

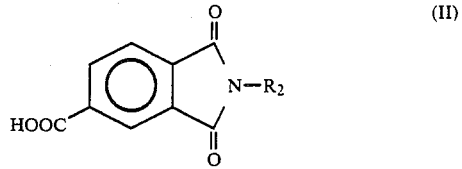

wherein

R$_2$ represents an aliphatic, aliphatic-aromatic or aromatic group.

3. Process for the production of polyamidimides by condensation of polyisocyanates, cyclic polycarboxylic acid anhydrides and lactams or polyamides in the presence of 0.1 to 10 mol-% of an imidocarboxylic acid wherein the polyamidimides are prepared in a first stage in a solvent, heated to temperature of from 200° to 250° C., optionally under pressure or after concentration of the reaction mixture, then further concentrated in an evaporation extruder at temperatures of from 240° to 400° C., optionally under vacuum, and condensed to form the end product.

* * * * *